United States Patent
Guthrie et al.

(10) Patent No.: US 6,721,853 B2
(45) Date of Patent: Apr. 13, 2004

(54) HIGH PERFORMANCE DATA PROCESSING SYSTEM VIA CACHE VICTIMIZATION PROTOCOLS

(75) Inventors: Guy Lynn Guthrie, Austin, TX (US); Ravi Kumar Arimilli, Austin, TX (US); James Stephen Fields, Jr., Austin, TX (US); John Steven Dodson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 09/895,232

(22) Filed: Jun. 29, 2001

(65) Prior Publication Data

US 2003/0005232 A1 Jan. 2, 2003

(51) Int. Cl.[7] .............................................. G06F 12/08
(52) U.S. Cl. ........................ 711/135; 711/144; 711/145
(58) Field of Search ................................ 711/120, 124, 711/130, 135, 141, 143, 144, 145, 146

(56) References Cited

U.S. PATENT DOCUMENTS

| | | | | |
|---|---|---|---|---|
| 5,325,504 A | | 6/1994 | Tipley et al. ................ 711/128 |
| 5,727,150 A | * | 3/1998 | Laudon et al. .............. 709/215 |
| 5,737,565 A | | 4/1998 | Mayfield .................... 711/213 |
| 5,893,149 A | * | 4/1999 | Hagersten et al. ........... 711/135 |
| 6,195,728 B1 | | 2/2001 | Bordaz et al. ............... 711/118 |
| 6,349,366 B1 | | 2/2002 | Razdan et al. ............... 711/141 |
| 6,374,329 B1 | * | 4/2002 | McKinney et al. .......... 711/141 |
| 6,397,302 B1 | | 5/2002 | Razdan et al. ............... 711/141 |
| 6,493,801 B2 | * | 12/2002 | Steely, Jr. et al. ........... 711/135 |
| 6,633,959 B2 | * | 10/2003 | Arimilli et al. .............. 711/141 |

* cited by examiner

*Primary Examiner*—Gary Portka
(74) *Attorney, Agent, or Firm*—Casimer K. Salys; Bracewell & Patterson, L.L.P.

(57) ABSTRACT

A cache controller for a processor in a remote node of a system bus in a multiway multiprocessor link sends out a cache deallocate address transaction (CDAT) for a given cache line when that cache line is flushed and information from memory in a home node is no longer deemed valid for that cache line of that remote node processor. A local snoop of that CDAT transaction is then performed as a background function by other processors in the same remote node. If the snoop results indicate that same information is valid in another cache, and that cache decides it better to keep it valid in that remote node, then the information remains there. If the snoop results indicate that the information is not valid among caches in that remote node, or will be flushed due to the CDAT, the system memory directory in the home node of the multiprocessor link is notified and changes state in response to this. The system has higher performance due to the cache line maintenance functions being performed in the background rather than based on mainstream demand.

11 Claims, 7 Drawing Sheets

Example Sequence (Prior Art)

| Steps/Sequence | P00 | L2:00 | L3:00 | SM_Dir10 | L3:30 | L2:30 | P10 |
|---|---|---|---|---|---|---|---|

Start of Ld_A

51) P00 does Ld_A Request — Ld_A →

52) Ld_A Req Sent over Link to home memory(SM_Dir10) — Ld_A →

53) SM_Dir10 gives response it is giving A as shared. SM_Dir10 marks Node00=S ← resp=go_S —

54) Data_A sent and stored in L2 and L3 as shared ← Data_A ← Data_A —

55) Data passed from L2 to P00 ← Data_A —

End of Ld_A

56) L2 LRU's A out of L2

57) L3 LRU's A out of L3 (line no longer in Node00)

*FIG. 3A (Prior Art)*

| Steps/Sequence | P00 | L2:00 | L3:00 | SM_Dir10 | L3:30 | L2:30 | P10 |
|---|---|---|---|---|---|---|---|
| Start of St_A | | | | | | | |
| 60) P30 wants to do a Store A | | | | | | | → Store_A → |
| 61) RWITM_A sent over link to Home memory(SM_Dir10) | | | | ←——— RWITM_A ——————————— | | | |
| 62) SM_Dir10 send Flush_A to Node00 since it thinks Node00=S(from step 53) | | ←——— Flush_A ——— Flush_A ——— | | | | | |
| 63) Node00 Indicates Flush_Done (line is already I) | | Flush_Done → | ─Flush_Done → | | | | |
| 64) Flush_Done(A) received by SM_Dir10 | | | | ─Flush_Done | | | |
| 65) SM_Dir10 can now indicate go_M to Node02 and send data_A (SM_Dir10 marks Node02=M) | | | | ─resp=go_M ——→ ———Resp=go_M →| | | |
| 66) SM_Dir10 allows Data_A to be sent to Node02's L2/L3 | | | | ——— Data_A ——→ Data_A ——→ | | | |
| 67) Store by P30 occurs to Data_A | | | | | | | ─Data_A → |
| End of St_A | | | | | | | |

Example Sequence

| Steps/Sequence | P00 | L2:00 | L3:00 | SM_Dir10 | L3:30 | L2:30 | P10 |
|---|---|---|---|---|---|---|---|

Start of Ld_A

151) P00 does Ld_A Request —Ld_A→

152) Ld_A Req Sent over Link to home memory(SM_Dir10) —Ld_A——→

153) SM_Dir10 gives response it is giving A as shared. SM_Dir10 marks Node00=S ←—resp=go_S—

154) Data_A sent and stored in L2 and L3 as shared ←Data_A——Data_A——

155) Data passed from L2 to P00 ←Data_A—

End of Ld_A

156) L2 LRU's A out of L2 —CDAT_A→

157) L3 LRU's A out of L3 SM_Dir10 marks Node00=I —RWITM_A→

*FIG. 6A*

| Steps/Sequence | P00 | L2:00 | SM_Dir10 | L3:00 | L3:30 | L2:30 | P10 |
|---|---|---|---|---|---|---|---|
| Start of St_A | | | | | | | |
| 160) P30 wants to do a Store A | | | | | | | ←— Store_A — |
| 161) RWITM_A sent over link to Home memory(SM_Dir10) | | | ←———— RWITM_A ———— | | | | |
| 162) NOP: Flush_A not sent by SM_Dir10 to Node00 since Node00=I (from step 157) | | | | | | | |
| 163) NOP | | | | | | | |
| 164) NOP | | | | | | | |
| 165) SM_Dir10 can now indicate go_M to Node02 and send data_A (SM_Dir10 marks Noed02=M) | | | —resp=go_M —→ ←— Resp=go_M —→ | | | | |
| 166) SM_Dir10 allows Data_A to be sent to Node02's L2/L3 | | | ←—— Data_A —— | ←— Data_A — | ←— Data_A — | | |
| 167) Store by P30 occurs to Data_A | | | | | | | — Data_A —→ |
| End of St_A | | | | | | | |

FIG. 6B

HIGH PERFORMANCE DATA PROCESSING SYSTEM VIA CACHE VICTIMIZATION PROTOCOLS

BACKGROUND OF THE INVENTION

1. Technical Field

The present invention relates to data processing systems, and particularly to processors operating in nodes of multi-way multiprocessor links. More specifically, the present invention relates to improving the performance of such data processing systems during flushes of cache memory in remote nodes of data obtained from memory in a home node on the link.

2. Description of the Related Art

A widely used high performance data processing system is a multiway multiprocessor link with several nodes. During operation of such a prior art data processing system, system memory for the overall data processing system was typically partitioned among memory components of the several nodes. It was thus common for cache memory in one node, called a remote node, to access/cache information resident in the memory of another node, termed a home node, for processing.

A memory directory in the home node kept record of the transfer of that information to the cache memory in the remote node. During data processing in the remote node, the transferred information in the cache memory of the remote node would periodically be designated as a victim and flushed from that cache, based on lack of recent usage or other reasons. The system memory in the home node of prior art data processing systems would at some subsequent time also perform a home memory address flush directed towards the transferred information in the remote node cache. This required transfers of requests and flush commands over the system links, being in effect what is known as a mainstream operation. In addition, it was often the case that the remote node cache memory had actually been flushed in the remote node some time before, making the home memory address flush a redundant operation.

This form of cache memory flush had undesirable effects, reducing system speed and performance and increasing system latency. This was undesirable in high performance data processing systems. It would, therefore, be desirable to reduce system latency in multiway multiprocessor links. It would also be desirable to have cache maintenance purges in multiway multiprocessor links be done on a basis that required less usage of the system links.

SUMMARY OF THE INVENTION

It is therefore an object of the invention to provide a method and system for high performance data processing in multiway multiprocessor links for cache maintenance purges with reduced usage of system links.

It is another object of the invention to provide a method and system for high performance data processing with reduced home memory address flushes to remote nodes in multiprocessor links.

It is still another object of the invention to provide a method and system for high performance data processing with reduced system latency by removing unnecessary memory purges from transmission over system links.

The above and other objects are achieved as is now described. A high performance data processing system and method are provided which improve operation of a multinode processor system by providing protocols for organized purges of cache memory in remote nodes when the cache memory is selected as a victim for purging. When a cache associated in a remote node (e.g. L2 cache) of the system identified as a victim is purged, its cache controller sends a cache deallocate address transaction over the system bus of that remote node. An inclusivity indicator for the associated cache is also provided in the L3 cache directory on the system bus for that remote node. The inclusivity indicator for the additional cache contains bits representing the valid/invalid status of each cache line in the associated cache on the system bus in the remote node. The inclusivity indicator changes state for the associated cache having its memory purged. An L3 cache directory in the node snoops the system bus for cache deallocate address transactions from other cache controllers on the node. The remote node notifies the home node of a cache deallocate address transaction when all cache memories of that remote node are indicated invalid. An inclusivity indicator in the remote L3 cache directory of the remote node changes state in response to such a notification. In addition, the home node maintains a system memory directory which consists of inclusivity bits that track which remote nodes have lines checked out from this home nodes system memory. The home node updates the inclusivity bits in its system memory directory when it receives a cache deallocate address transaction from the remote node. Performance of cache line maintenance functions over system links in the multinode system are thus substantially reduced.

The foregoing and other objects and advantages of the present invention will be apparent to those skilled in the art, in view of the following detailed description of the preferred embodiment of the present invention, taken in conjunction with the appended claims and the accompanying drawings.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
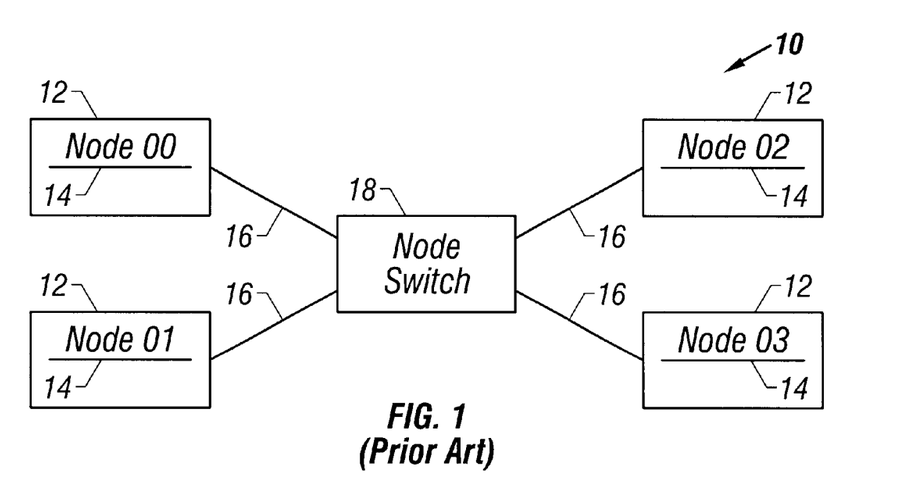
FIG. 1 is a block diagram of a high performance data processing system of a multiway multiprocessor link of several nodes.
Figure 2:
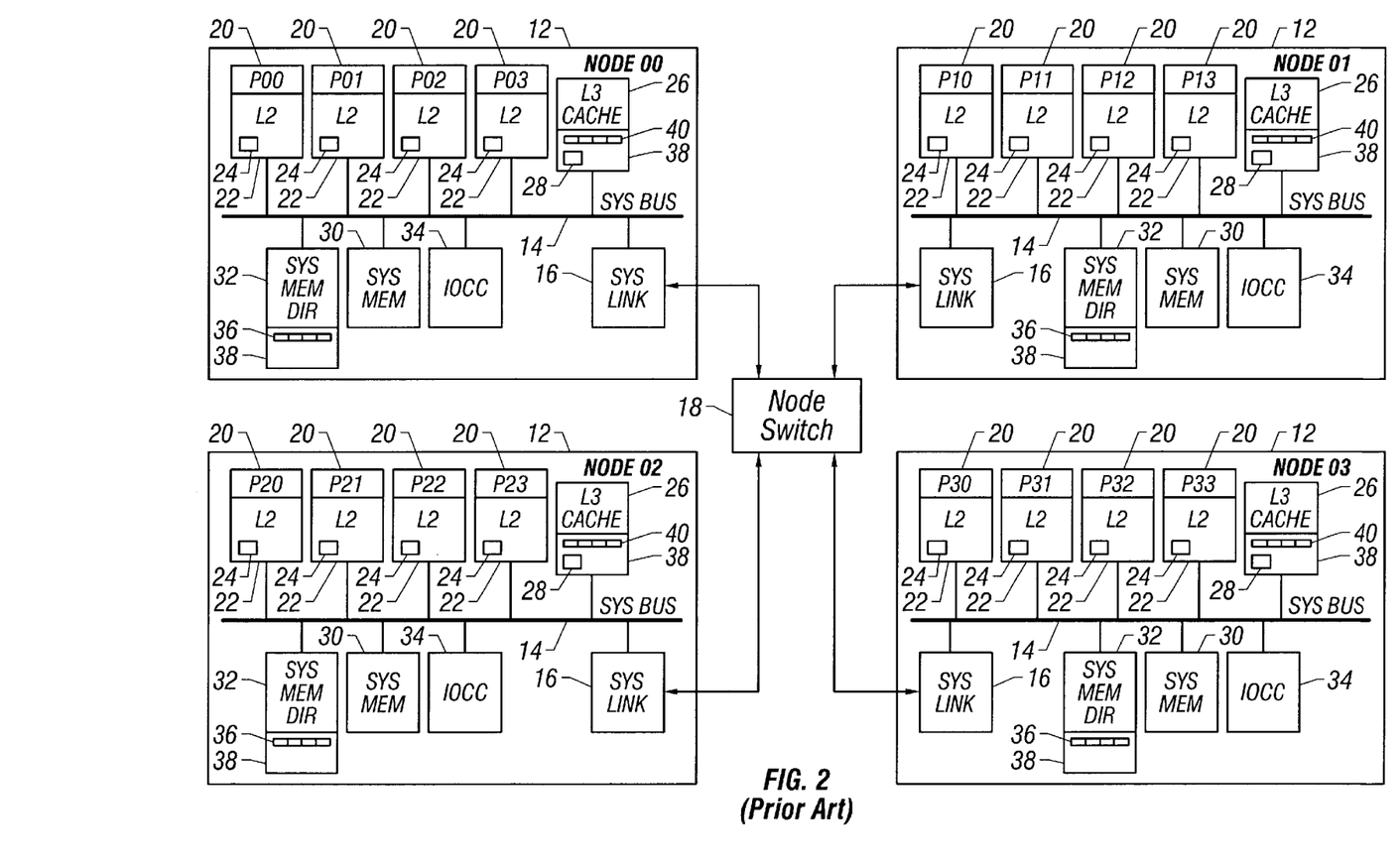
FIG. 2 is a block diagram of a node according to the prior art in the data processing system of FIG. 1.

At the outset, an example of a cache memory purge according to the prior art is set forth in order that the operation of a high performance data processing system can be more easily understood. FIG. 1 in the drawings shows an example multiway high performance data processing system 10 with several nodes 12. Each of the nodes 12 has a system bus 14 connected through a link 16 of that node 12 to a node switch 18 to form the high performance data processing system 10. FIG. 2 illustrates typical components of an example node 12 in the form of a four way link, composed of four processors 20 sharing the system bus 14. Each of the processors 20 in the nodes 12 have an L2 cache memory 22 with a cache line 24. The node 12 also includes an associated L3 cache 26 or higher level cache shared in common over the system bus 14 with each of the four L2 cache memories 22. The cache lines 24 in each of the L2 cache memories 22 of the node 12 each communicate over the system bus 14 with a cache line 28 in the associated cache 26.

The associated L3 cache 26 is connected to the system bus 14, as are the link 16 and a system memory 30, a system memory directory 32 and an input/output or I/O channel controller 34. The I/O channel controller 34 permits connection of conventional I/O devices through various types of computer I/O buses, such as a PCI bus, to the system bus 14 to form a part of the node 12.

The system memory 30 of each node 12 serves as a permanent storage location for a portion of the data resident in the data processing system 10 and is called the home node for such purposes. The system memory directory 32 for system memory 30 includes an associated memory location or storage register 36 for inclusivity bits for each cache line that makes up system memory 30 in the home node. The inclusivity bits in storage location 36 correspond in number to the number of other nodes 12 of the data processing system 10 that may currently have that line cached. During the operation of data processing system 10, memory units in other nodes 12 may request and use information permanently resident in another or home node 12. In this situation the requesting node is referenced to as a remote node. The inclusivity bits in storage register 36 of each home node 12 indicate which of the other remote nodes have temporarily received and stored in their L3 cache 26 data which is permanently resident in the memory 30 of the home node 12.

The associated or L3 cache 26 in each node 12 has a directory 38 including a storage location or register 40 for inclusivity bits corresponding in number to the number of associated L2 cache memories 22 sharing that L3 cache 26.

During the conventional prior art operation of cache memory in nodes 12 of data processing system 10, the L2 cache 22 periodically cleared or flushed the L2 cache memories 22 associated with it. Based on each of recent usage demands, the L2 cache 22 flushed cache memory on a least recently used (LRU) basis from an L2 cache memory 22, known as a victim, associated with one of the processors 20. When this occurred, the inclusivity bit in the storage location 36 for that associated L2 cache memory 22 in the remote node would not change state. In addition, the system memory directory 32 in the home node would not be informed of this change. Rather, at some later time the home node system memory flushed the L3 cache of that remote node based on a demand request by a processor to store to that cache line. For multiway multiprocessor links, however, this technique required that home memory address flushes be performed over the system links or busses before allowing the processor to complete the store. As such, it had undesirable effects on system performance, speed and latency.

Figure 3A:
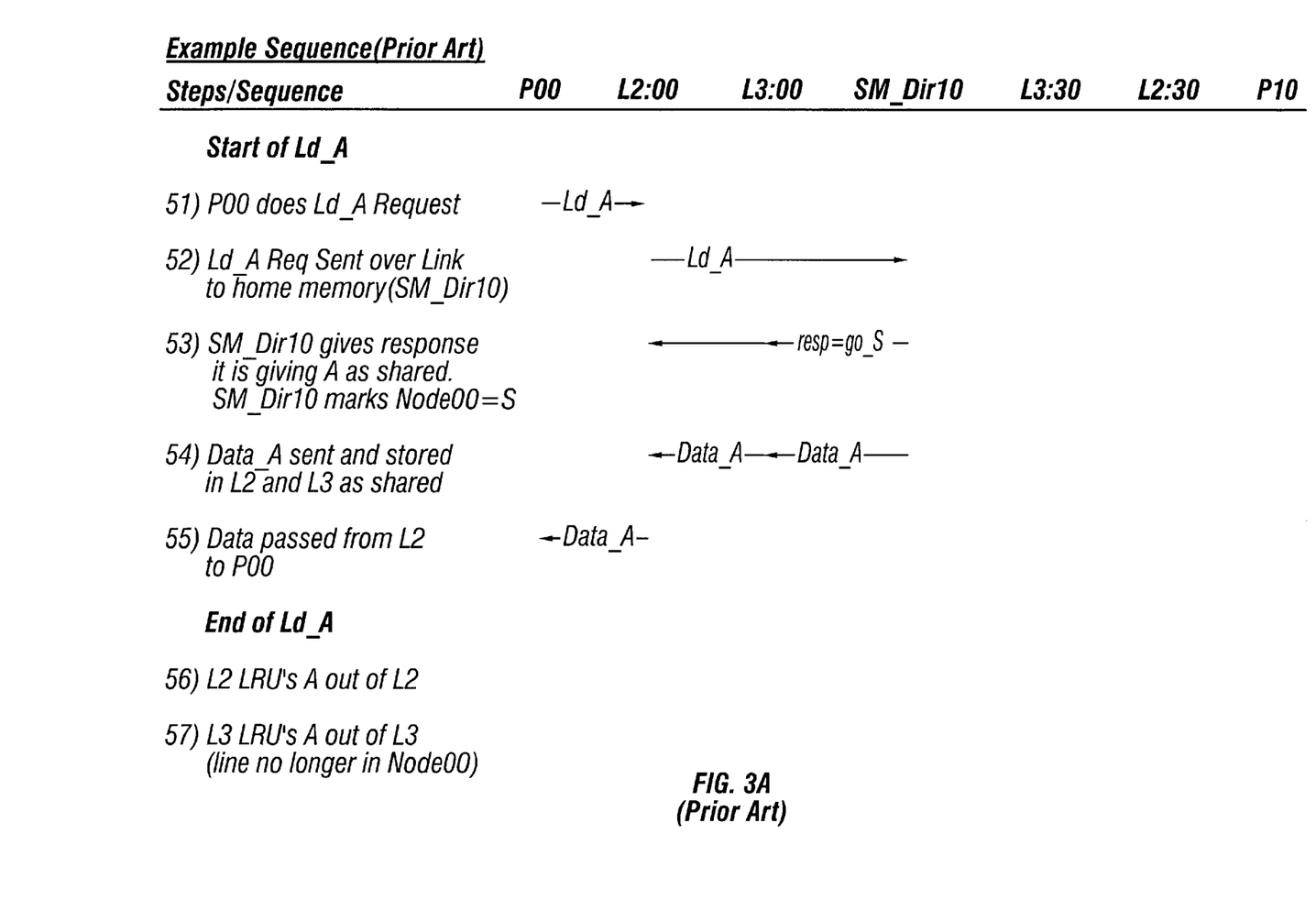
FIGS. 3A and 3B are schematic diagrams of an example sequence flow of a cache memory flush according to the prior art in the remote node of FIG. 2.
Figure 3B:
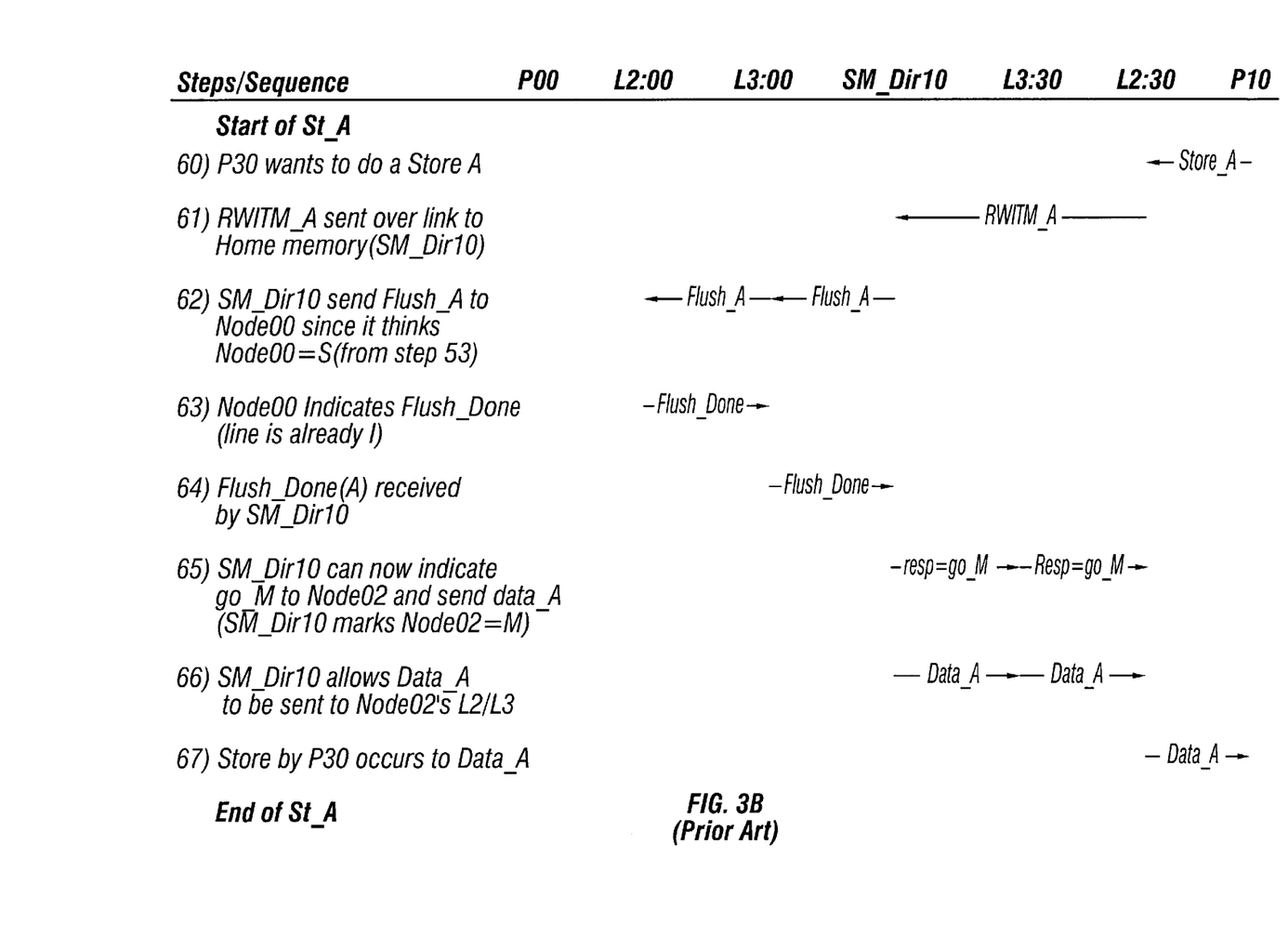

FIGS. 3A and 3B in the drawings show an example operating sequence of the prior art data processing system 10 using nodes 12. In this example, the system memory 30 of each node 12 in FIG. 1 contains a partitioned segment of the overall system memory of data processing system 10. The four nodes 12 of like structure in system 10 of FIG. 2 are identified as nodes 00, 01, 02 and 03 for purposes of separate reference. Further, in this example, the system memory 30 of node 01 manages in its system memory, and maintains in its storage location 36, a set of inclusivity bits indicating the state of cache lines checked out of a home node 01 by the other three nodes 00, 02 and 03.

In step 51 of FIG. 3A, a request for data block A, termed a Ld-A request operation or step, is sent from cache line 24 for a requesting one, designated P00, of the processors 20 in remote node 00. In step 52 of FIG. 3A, the Ld-A request is sent over the link 16 to the system memory 30 of home node 01. In step 53, the system memory 30 of the node 00 prepares to transfer the requested data to the requesting cache and the system memory directory 36 in the node 00 indicates this transaction. In step 54, the requested data is sent and stored in the associated L2 cache 22 and the additional L3 cache 26 of the remote node 00. In step 55, the data is transferred from the associated L2 cache 22 to its requesting processor 20 (designated P00), completing the Ld-A transaction.

After some period of time, the data A transferred in the foregoing manner is flushed from L2 cache 22 in the node 00 as indicated at step 56 and subsequently flushed from L3 cache 26 in node 00, as indicated in step 57. At this point, the data originally requested and used in the remote node 00 is no longer resident in either cache of that remote node, but the system memory directory 36 of the home node 01 still indicates the data as resident in the cache in that remote node 00.

At some future later point in time, another processor in the system 10, such as a processor 20 (designated P30) in node 03 sends an indication as shown in step 60 (FIG. 3B) to store the same data A to the L2 cache 22 of node 03. In step 61, that indication is sent to system memory directory 32 in remote node 00. During step 62, the system memory directory node 32 in home node 01 sends a flush_A command to node 00. As a result of step 53 above, the system memory directory 32 in Node 01 still indicates data A as resident in cache memory in node 00.

During step 63, the L2 cache 22 in Node 00 indicates that the flush has been performed, since the associated cache line for that node 00 is indicated invalid as a result of step 56 previously being performed. During step 64, the L3 cache 26 in node 00 sends a indication to the system memory directory 32 in node 01. As a result, during step 65, the system memory directory 32 in node 01 can now indicate authorization to Node 03 to perform the requested Store A operation. During step 66, the system memory directory 32 in home node 01 now permits data A to be sent to the L3 cache 26 and the L2 cache in node 03. As a result, during step 67, data A is stored by processor 20 (designatedP30). As can be understood from the foregoing operations, a number of mainstream operations over system links are required to be performed.

Figure 4:
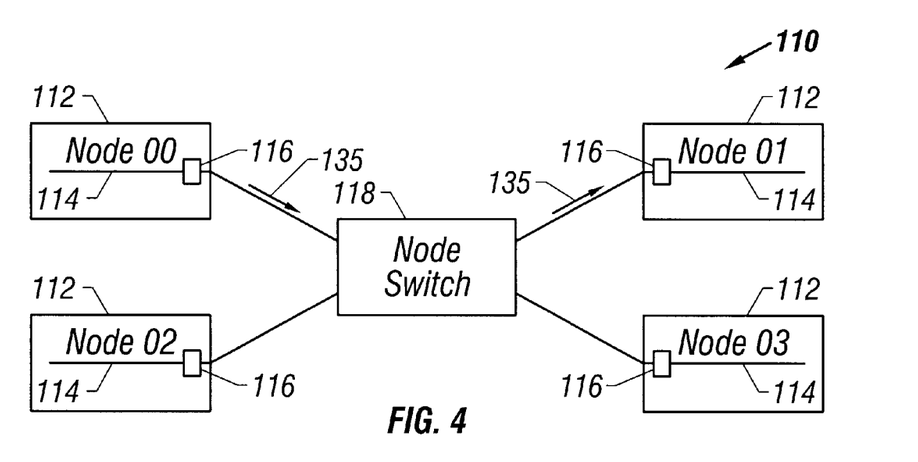
FIG. 4 is a block diagram of a high performance data processing system of a multiway multiprocessor link according to the present invention.
Figure 5:
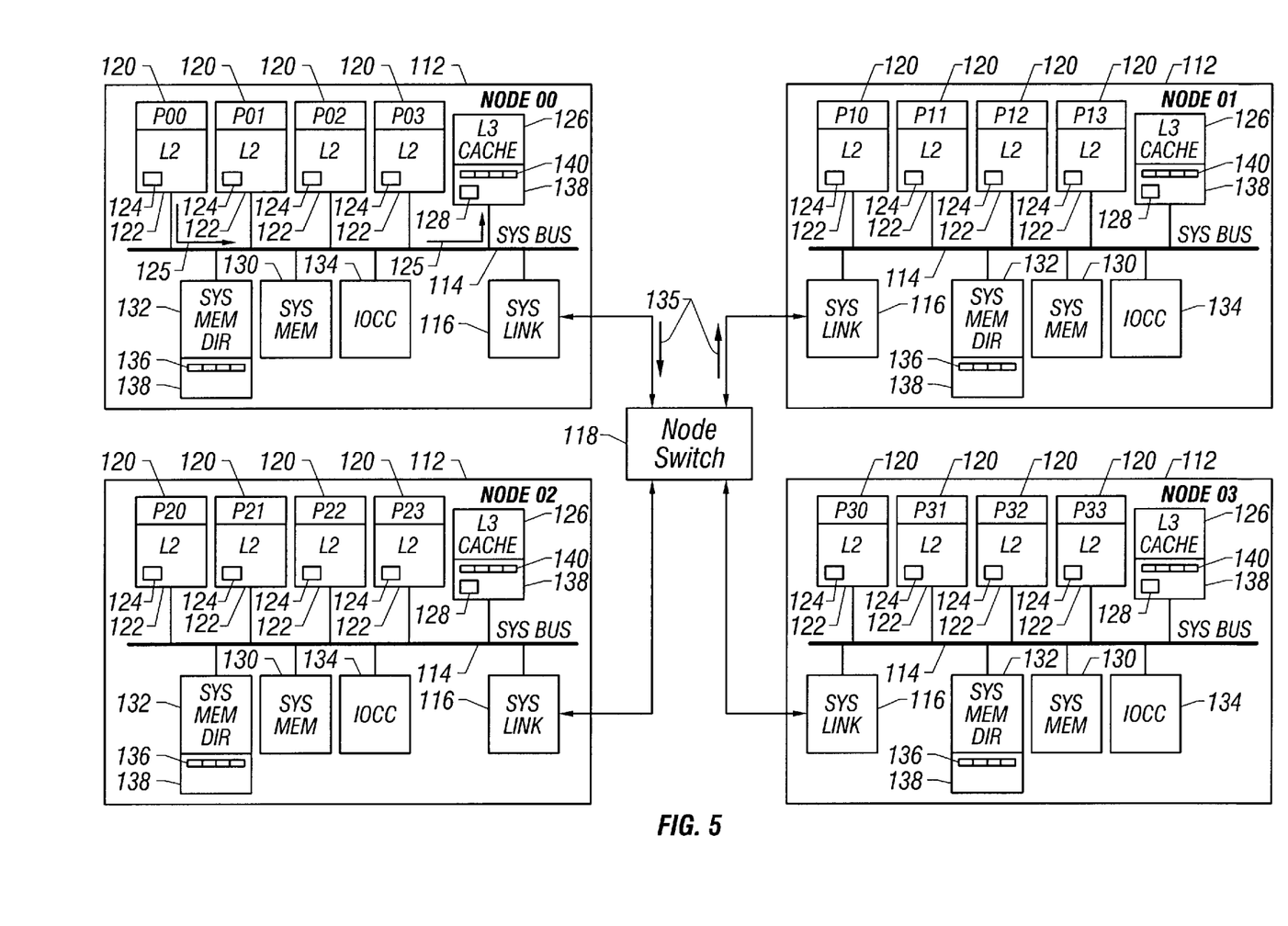
FIG. 5 is a block diagram of a node according to the present invention in the data processing system of FIG. 4.

Turning to the present invention, with reference now to the figures and in particular with reference to FIG. 4, an example multiway high performance data processing system 110 with several nodes 112 is shown. The data processing system 110 operates differently from the data processing system 10 of FIG. 1 as will be set forth below despite structural similarities. Each of the nodes 112 has a system bus 114 for connection through a link 116 of that node 112 to a node switch 118 to form the high performance data processing system 110. FIG. 5 illustrates typical components of an example node 112 in the form of a four way link, composed of four processors 120 sharing the system bus 114. Each of the processors 120 in the nodes 112 have an L2 cache memory 122 with a cache line 124. The node 112 also includes an associated L3 cache 126 or higher level cache shared in common over the system bus 114 with each of the four L2 cache memories 122. The cache lines 124 in each of the L2 cache memories 122 of the node 112 each communicate over the system bus 114 with a cache line 128 in the associated cache 126.

The associated L3 cache 126 is connected to the system bus 114, as are the link 116 and a system memory 130, a system memory directory 132 and an input/output or I/O channel controller 134. The I/O channel controller 134 permits connection of conventional I/O devices through various types of computer I/O buses, such as a PCI bus, to the system bus 114 to form a part of the node 112.

The system memory 130 of each node 112 serves as a permanent storage location for a portion of the data resident in the data processing system 110 and is called the home node for such purposes. The system memory directory 132 for system memory 30 includes an associated memory location or storage register 136 for inclusivity bits for each cache line that makes up system memory 30 in the home node. The inclusivity bits in storage location 136 correspond in number to the number of other nodes 112 of the data processing system 110 that may currently have that line cached. During the operation of data processing system 110, memory units in other nodes 112 may request and use information permanently resident in another or home node 112. In this situation the requesting node is referenced to as a remote node. The inclusivity bits in storage register 136 of each home node 112 indicate which other nodes have temporarily received and stored in the L3 cache 126 of those remote nodes 112 data which is permanently resident in the memory 130 of that home node 112.

The associated or L3 cache 126 in each node 112 has a directory 138 including a storage location or register 140 for inclusivity bits corresponding in number to the number of associated L2 cache memories 122 sharing that L3 cache 126.

During the operation of cache memory in nodes 112 of data processing system 110 according to the present invention, the L2 cache 122 in the remote node periodically clears or flushes the L2 cache memories 122 associated with it. Based on each of recent usage demands, the L2 cache 122 flushes cache memory on a least recently used (LRU) basis from an L2 cache memory 122, known as a victim, associated with one of the processors 120.

A cache controller resident in the L2 cache 122 on the remote node sends a cache deallocate address transaction (CDAT) as indicated by arrows 125 to the L3 cache 126 for the remote node 112. The cache controllers for each of the L2 caches 122 in the remote node snoop the system bus for CDAT's from the other cache controllers of that remote node. The CDAT from the cache controller performing the flush transaction is provided to the L3 cache 126 for the remote node, causing the status of the inclusivity bit in the L3 cache 136 to change, indicating that the data previously cached is no longer valid in the L2 caches. The L3 cache controller for the remote node 112 in response to the CDAT scans the snoop responses of each of the L2 caches in the remote node 112. So long as any one of the L2 (or the L3) caches indicates that the data being flushed from another L2 cache is still valid, no flush status coherency exists and the inclusivity bit in the L3 cache 126 for that L2 cache does not change state. Rather, the inclusivity bit in L3 cache 126 for that L2 cache indicates that data is still valid.

In the event, however, the snoop responses of each of the L2 caches 120 and L3 cache 126 in the remote node indicate that the data being flushed is not present in any of such L2/L3 caches cache flush status coherency exists. As a result, as indicated by arrow 135, the link 116 for the remote node transmits the CDAT to the system memory directory 132 in the home node. In this manner, the home node is informed of the cache flush in a remote node. Further, this flush is done as a background function.

Figure 6A:
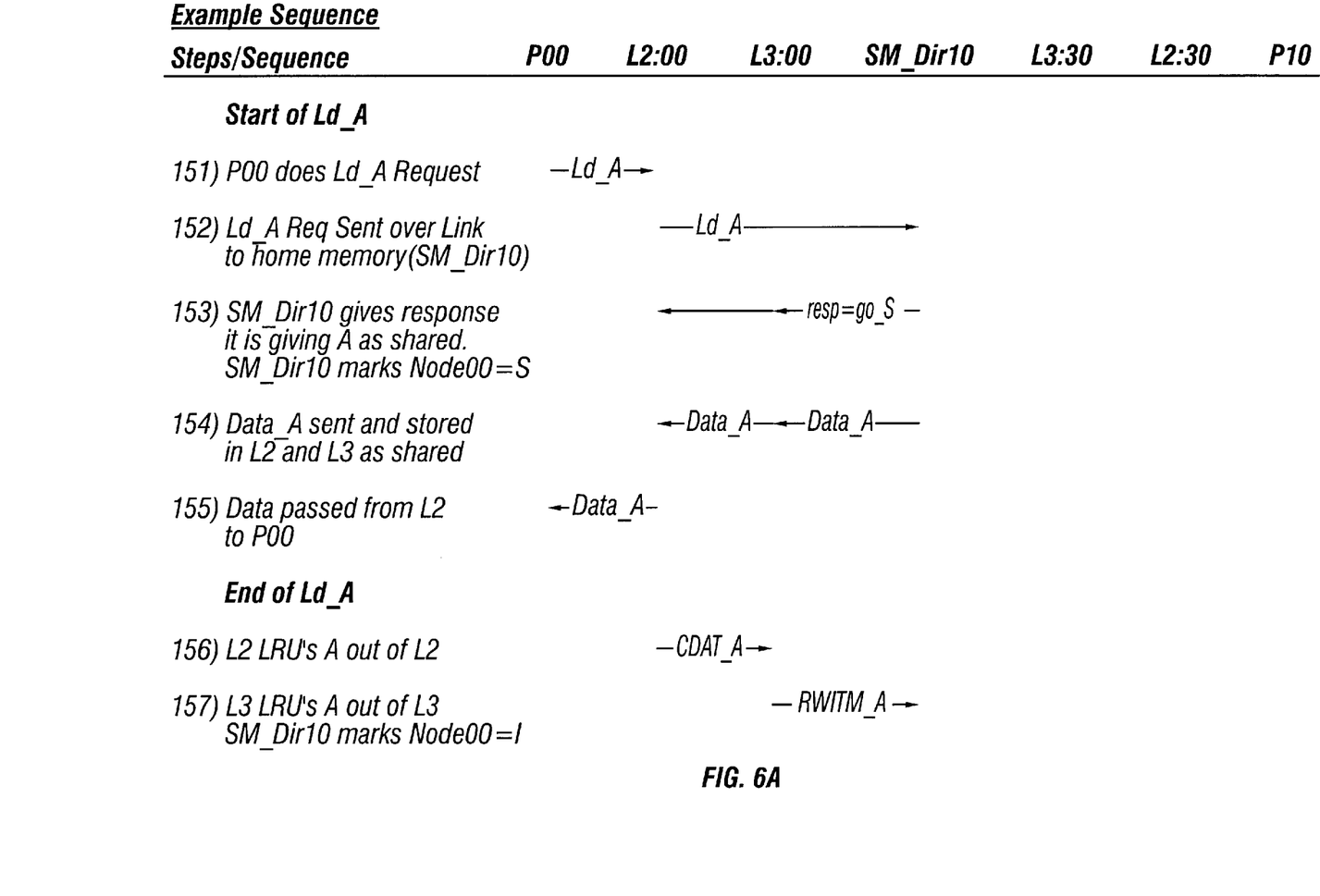
FIGS. 6A and 6B are schematic diagrams of an example sequence flow of a cache memory flush according to the present invention in the remote node of FIG. 5.
Figure 6B:
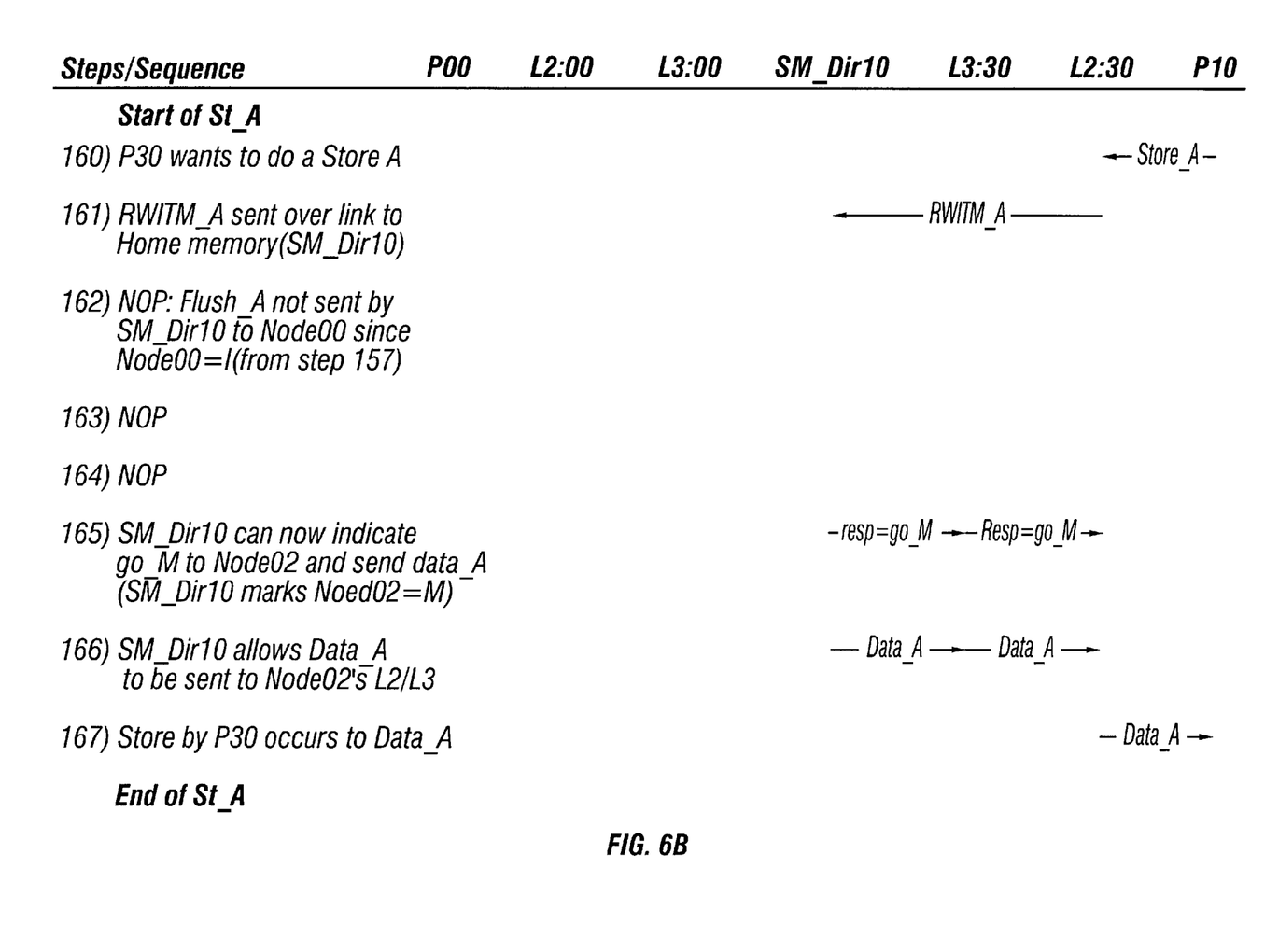

FIGS. 6A and 6B in the drawings show an example operating sequence of the data processing system 110 according to the present invention, operating in response to a similar set of data transfer requests to those shown in FIGS. 3A and 3B. Steps 151 through 155 in FIG. 6A are performed in a like manner to the operation described above in FIG. 3A and accordingly their description is not repeated here.

With the present invention, during step 156 as shown in FIG. 6A, the L2 cache 122 of processor P00 in node 00 being flushed sends the cache address deallocate transaction (CDAT) described with reference to the structure of FIGS. 4 and 5 to its L3 cache 126. For purposes of this example, the snoop performed by the other L2 caches 122 indicates that the data is also invalid for those caches. As a result, during step 157, the L3 cache indicates the change in status of inclusivity bit to the system memory directory 130 of the home node 01. At this time, the home node 01 changes the state of its inclusivity bit in its system memory directory 130.

At some subsequent time, another processor in another node, such as processor 120 (designated P30) in node 03 sends an indication as shown in step 160 to store data A in its L2 cache. In step 161, that indication is sent to system memory directory 132 in home node 01. As a result of the operation of the data processing system 110 of the present invention (FIGS. 4 and 5) during steps 156 and 157 as described above, the system memory directory 132 in home node 01 during step 157 has been informed that the requested data has been previously purged from the remote node 00. This is indicated by steps 162, 163 and 164 being indicated NOP in FIG. 6. The system memory directory 132 for the home node 01 can as a result now indicate authorization, as shown at step 165, for the requested operation. During step 166, the requested data is transferred to the L3 cache and the L2 cache of node 03 which now is the remote node. During step 167, the data from L2 cache is then stored to processor P30 on node 03.

It should be understood that the system of the present invention described in the foregoing embodiment could be used in systems with a larger hierarchy. However, in most of those higher order hierarchies, the L3 cache line does not need to send flushes to high order CPU's and the foregoing example of FIGS. 5 and 6 is still applicable for the higher order hierarchies.

It is to be noted that with the present invention, a transaction of the type illustrated in FIGS. 6A and 6B is not a retriable operation, and can be thus deemed a weak or imprecise bus transaction. Should any problem occur during the course of such a transaction with receipt of the CDAT and proper response of the system, the CDAT is ignored. If desired, however, the processing system of the present may be programmed to send the CDAT in a multishot manner on occurrence of a victim cache purge. In such a case, the cache controller for the victim cache would send several CDAT transmissions rather than a single one as described.

Further, the cache deallocate access transaction (CDAT) may be enlarged in content to carry information beyond the indication that a victim cache purge has taken place. Examples of the additional information that can be added as code bits to the cache deallocate access transaction are: whether the information purged from the cache was address, instructions or data; whether the information purged had been subject to multiple previous uses while in cache; and the like.

With the present invention, a home memory and thus the entire system exhibit higher performance. The contents of the inclusivity indicators in the system memory directory are maintained more current and accurate. Thus, the cache lines for the home memory more accurately reflect the status of memory contents in cache in another node at any particular time.

Accordingly, the data processing system of the present invention offers reduced latency. The number of home memory flushes to remote nodes is fewer. Further, the home memory when necessary can use information gained from its system directory inclusivity indicator bits to select a cache as victim to be purged rather than being forced to rely solely on the LRU (or least recently used) basis. This allows more cache lines to be active and also reduces artificial invalidation of remote mode cable lines.

Further, operations of the system of the present invention assist in recovery. In the event that a node crashes, the home node during system recovery has access in its system directory to what data was checked out to the crashed remote node at the time the remote node crashed. If desired, the information made available with the present invention may be used to adapt processor usage according to cache demand experience. For example, if a remote node processor has been continuously borrowing data from the home node memory, the processing functions could be transferred to the home node.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A data processing system comprising:
   a node interconnect;
   a plurality of nodes interconnected by the node interconnect for transfer of data for processing in the plurality of nodes;
   each node including one or more processors, each processor having at least one associated cache memory;
   each node serving as a home node for portions of data stored therein and transferring segments of that data to another node for processing in that other node as a remote node;
   at least one cache memory in the remote node deallocating cached data received from a home node;
   wherein said cache memory, responsive to a determination to deallocate the data, issues a cache deallocate address transaction only within said remote node, said cache deallocate address transaction inquiring whether each processor within the remote node has further need for the deallocated data;
   the remote node including inclusivity indicators that indicate whether data from other nodes is cached within the remote node, wherein at least one of the cache memories updates said inclusivity indicators in response to receipt of responses to said cache deallocate address transaction to identify at least one cache in which the deallocated data is invalid; and
   the remote node, responsive to said inclusivity indicators indicating that no processor within the remote node has further need of the deallocated data, notifying the home node, via the node interconnect, of deallocation of the deallocated data by all cache memories within the remote node, said notifying being performed without the remote node receiving, via the node interconnect, a transaction from another node specifically identifying said deallocated data.

2. The data processing system of claim 1, wherein each home node includes inclusivity indicators that identify any other nodes that are possibly storing data allocated to that home node.

3. The data processing system of claim 1, wherein said at least one associated cache memory of each processor within the remote node collectively comprise a respective upper level cache uniquely associated with each processor and at least one lower level cache that contains and updates said inclusivity bits.

4. The data processing system of claim 1, wherein said at least one cache memory in the remote node deallocates said deallocated data without receiving, via the node interconnect, a transaction from another node specifically identifying the deallocated data.

5. A data processing node connectable in a multinode data processing system, said node comprising:
   one or more processors each having at least one associated cache memory;
   the node serving as a remote node when receiving, in the cache memory, segments of data transferred to the node;
   at least one associated cache memory deallocating cached data received from another;
   the remote node, responsive to said cache memory deallocating the deallocated data, issuing a cache deallocate address transaction only within said remote node, said cache deallocate address transaction inquiring whether each processor within the remote node has further need for the deallocated data;
   the remote node including inclusivity indicators that indicate whether data from other nodes is cached within the remote node, wherein said remote node updates said inclusivity indicators in response to receipt of responses to said cache deallocate address transaction to identify at least one cache in which the deallocated data is invalid; and
   the remote node, responsive to said inclusivity indicators indicating that no processor within the remote node indicating further need for the deallocated data, notifying the home node, via the node interconnect, of deallocation of the deallocated data by all processors within the remote node, said notifying being performed without the remote node receiving, via the node interconnect, a transaction from another node specifically identifying said deallocated data.

6. The data processing node of claim 5, wherein said at least one associated cache memory of each processor within the remote node collectively comprise a respective upper level cache uniquely associated with each processor and at least one lower level cache that contains and updates said inclusivity bits.

7. The data processing node of claim 5, wherein said at least one associated cache memory in the remote node deallocates said deallocated data without receiving, via the node interconnect, a transaction from another node specifically identifying the deallocated data.

8. A method of optimizing performance of a multinode data processing system by selective deallocation notification by a remote node of the system, said method comprising:

deallocating cached data received from a home node from a cache memory in a remote node among the nodes of the multinode data processing system;

in response to said deallocating, issuing a cache deallocate address transaction only within said remote node, said cache deallocate address transaction inquiring whether each processor within said remote node has further need for the deallocated data;

updating inclusivity bits within said remote node in response to receipt of responses to said cache deallocate address transaction to identify at least one cache in which the deallocated data is invalid; and in response to said inclusivity bits indicating that no processor within the remote node has further need for the deallocated data, notifying the home node, via a node interconnect, of deallocation of the deallocated data by all processors within the remote node, said notifying being performed without the remote node receiving, via the node interconnect, a transaction from another node specifically identifying said deallocated data.

9. The method of claim 8, wherein the nodes have inclusivity indicators and further including the step of:

changing the status of inclusivity indicators in the other nodes in response to the notifying.

10. The method of claim 8, wherein each processor within the remote node has a respective upper level cache uniquely associated with that processor and said remote node has at least one lower level cache, said method comprising:

maintaining said inclusivity bits within the lower level cache; and said lower level cache updating said inclusivity bits.

11. The method of claim 8, wherein said deallocating comprises said cache deallocating said data without receiving, via the node interconnect, a transaction from another node specifically identifying the deallocated data.

* * * * *